(12) United States Patent
White et al.

(10) Patent No.: US 7,909,898 B2
(45) Date of Patent: Mar. 22, 2011

(54) METHOD OF TREATING A GASEOUS MIXTURE COMPRISING HYDROGEN AND CARBON DIOXIDE

(75) Inventors: Vincent White, Epsom (GB); Rodney John Allam, Guildford (GB)

(73) Assignee: Air Products and Chemicals, Inc., Allentown, PA (US)

( * ) Notice: Subject to any disclaimer, the term of this patent is extended or adjusted under 35 U.S.C. 154(b) by 1167 days.

(21) Appl. No.: 11/345,051

(22) Filed: Feb. 1, 2006

(65) Prior Publication Data
US 2007/0178035 A1    Aug. 2, 2007

(51) Int. Cl.
*B01D 53/22* (2006.01)
(52) U.S. Cl. ........... 48/197 FM; 48/198.1; 423/248; 423/220; 423/245.1; 60/39.12
(58) Field of Classification Search ....... 423/210–215.5, 423/414–445 B, 579–594.19, 644–658.3
See application file for complete search history.

(56) References Cited

U.S. PATENT DOCUMENTS

| | | | | |
|---|---|---|---|---|
| 4,542,114 | A | * | 9/1985 | Hegarty ................. 502/39 |
| 5,644,911 | A | * | 7/1997 | Huber .................. 60/775 |
| 5,852,927 | A | * | 12/1998 | Cohn et al. ............. 60/780 |
| 5,955,039 | A | | 9/1999 | Dowdy |
| 2002/0068768 | A1 | * | 6/2002 | Wallace et al. ........... 518/728 |
| 2002/0112479 | A1 | * | 8/2002 | Keefer et al. ............ 60/651 |
| 2005/0109037 | A1 | * | 5/2005 | Deckman et al. .......... 60/777 |
| 2007/0000176 | A1 | * | 1/2007 | Liu et al. ................ 48/198.1 |

FOREIGN PATENT DOCUMENTS

| | | |
|---|---|---|
| EP | 0 262 894 A2 | 4/1988 |
| EP | 0 262 894 B1 | 3/1992 |
| WO | 02/072470 A1 | 9/2002 |
| WO | 2005/009892 A2 | 2/2005 |

OTHER PUBLICATIONS

Thomas, Carbon Dioxide Capture for Storage in Deep Geologic Formations—Results form the CO2 Capture Project, 2005, Elsevier, vol. 1, pp. 451-475.*
Wilkinson, Oxyfuel Conversion of Heaters and Boilers for CO2 Capture, May 5-8, 2003, Second National Conference on Carbaon Sequestration.*
Dillon, et al., "Oxy-Combustion Processes for CO2 Capture From Advanced Super-Critical PF and NGCC Power Plants", Proceeding on the 7th International Conference on Greenhouse Gas Control Technologies; Sep. 2004; Vancouver, Canada.

* cited by examiner

*Primary Examiner* — Alexa D Neckel
*Assistant Examiner* — Imran Akram
(74) *Attorney, Agent, or Firm* — Willard Jones, II; Eric J. Schaal

(57) ABSTRACT

Hydrogen ($H_2$) gas and crude carbon dioxide ($CO_2$) gas are separated from a gaseous mixture thereof. Combustible gas(es) in the crude $CO_2$ gas are combusted to produce heat, at least a portion of which is recovered by indirect heat exchange with at least a portion of the separated $H_2$ gas or a gas derived therefrom. The invention may be integrated with coal-fired power stations to reduce or eliminate emission of harmful components into the atmosphere.

20 Claims, 2 Drawing Sheets

METHOD OF TREATING A GASEOUS MIXTURE COMPRISING HYDROGEN AND CARBON DIOXIDE

BACKGROUND OF THE INVENTION

The present invention relates to a method of treating a gaseous mixture comprising hydrogen ($H_2$), carbon dioxide ($CO_2$) and at least one combustible gas selected from the group consisting of hydrogen sulfide ($H_2S$), carbon monoxide (CO) and methane ($CH_4$). The invention is preferably integrated with fossil fuel-fired power stations to reduce or eliminate emission of $CO_2$ and other atmospheric pollutants. The main fuel of interest is coal although the invention has application in the generation of power from other fuels such as bitumen, petcoke and natural gas.

There is an need to develop improved methods for efficient power generation from fossil fuels, including carbonaceous and hydrocarbonaceous fuels, and biomass fuel, with virtually zero emission of atmospheric pollutants, particularly $CO_2$. There are three basic techniques in the context of $CO_2$ capture from power generation equipment using these types of fuel:

(a) pre-combustion decarbonization;
(b) $CO_2$ removal from flue gases following combustion; and
(c) oxy-fuel combustion systems.

The present invention is in the field of pre-combustion decarbonization. In pre-combustion decarbonization, the fuel is reacted with pure oxygen ($O_2$) and converted by a partial oxidation reaction into a synthesis gas mixture consisting predominantly of $H_2$ and CO. The CO can be converted to $H_2$ and $CO_2$ by a catalytic shift conversion reaction with water ($H_2O$). The $CO_2$ and $H_2$ are separated and the $H_2$ is burned in a gas turbine combined cycle power generation system producing electric power. The sulphur content of the fuel, present as $H_2S$ following the shift conversion step, must be separated from the $CO_2$ for disposal and not vented to atmosphere either as $H_2S$ or $SO_2$. Thus, $CO_2$ and $H_2S$ must be separated from the $H_2$ prior to combustion. The $CO_2$ is usually compressed to pipeline pressure (about 100 bar to about 250 bar) for transfer to a storage site.

Previous studies have typically shown that pre-combustion decarbonization can be applied to power generation from coal with $CO_2$ capture leading to power generation efficiencies of about 36% to 40% based on the lower heating value ("LHV") of the fuel.

$H_2$ gas may be produced from carbonaceous or hydrocarbonaceous fuels (such as petcoke, bitumen, natural gas and, in particular, coal) using partial oxidation technology to initially convert the fuel, by reaction with $O_2$ at high temperature, to a crude synthesis gas mixture comprising $H_2$, CO, $CO_2$, $H_2O$, $H_2S$, carbonyl sulfide (COS), carbon disulfide ($CS_2$), $CH_4$ and other minor impurities.

The crude synthesis gas is usually cooled and, particularly when gasifying coal, any ash removed therefrom. The cooling and ash removal steps may be carried out simultaneously by washing the gas with water. Alternatively, the gas can be cooled in a heat exchanger and the heat recovered to produce, for example, high pressure steam. The bulk of the ash is, in this case, removed in a molten state from the gasifier and the remaining fly ash is removed by filtration following heat recovery. Either way, the resultant cooled gas is then usually passed through a sulfur-tolerant shift catalyst (possibly in a multi-stage system with inter-stage cooling or with a single stage reactor with internal cooling) to convert CO with steam to $H_2$ and $CO_2$. Any COS and $CS_2$ is converted simultaneously to $H_2S$ and $CO_2$.

Current technology would then be used to selectively separate $H_2S$ and $CO_2$ from $H_2$, usually by passing the gas into a physical solvent absorption process which are expensive and require significant utility consumption during operation.

The Inventors have discovered that non-selective separation of $H_2S$ and $CO_2$ from $H_2$ provides advantages over existing selective separation technologies, particularly when the process is integrated with a gas turbine for the production of electricity.

EP-A-0262894 (Lerner et al; published 6 Apr. 1988) discloses a process for co-production of enriched streams of separate $CO_2$ and $H_2$ products from, for example, the effluent from a steam methane reformer. A pressure swing absorption ("PSA") unit is used for the separation producing a primary stream of enriched hydrogen which may be liquefied. The purge stream from the $H_2$ PSA, comprising $CO_2$ and combustible gases including CO, $CH_4$ and $H_2$, is combusted to yield $CO_2$ and to produce electricity which can be used, for example, in the liquefaction of the $H_2$. The $H_2$ PSA purge is combusted in the presence of pure or enriched oxygen in an internal combustion engine, gas turbine or other combustion device that can be used to generate power. The exhaust gas from the combustor is typically cooled, condensing the water vapor which is subsequently removed and, preferably, a portion of the exhaust gas is recycled as feed to the combustor to control the maximum temperature achieved in the combustor. It is further disclosed that waste heat recovery from the combustion exhaust may be used to raise steam. EP-A-0262894 exemplifies the use of an internal combustion engine to combust the PSA purge gas.

It is an objective of preferred embodiments of the present invention to provide an improved, lower cost high efficiency method of separating synthesis gases derived from partial oxidation or reforming of carbonaceous or hydrocarbonaceous fuels or biomass into pure $H_2$ and pure $CO_2$ gases and, in some embodiments, a separate stream containing any sulfur from the primary fuel.

An integrated gasification combined cycle ("IGCC") system may be used to generate power, such as electrical power, from a carbonaceous fuel such as coal. The fuel is gasified to produce a synthesis gas mixture of CO and $H_2$ which is converted in a catalytic shift reaction, in the presence of $H_2O$, to produce $H_2$ and $CO_2$. Any sulfur present in the fuel is converted to $H_2S$ plus minor amounts of COS and $CS_2$. After separation from $CO_2$ and, if present, $H_2S$, $H_2$ is used as a fuel in a gas turbine to generate power. It is known in the art to recover heat from gas turbine exhaust to preheat boiler feed water for an oxyfuel boiler in a coal fired power station.

It is a further objective of preferred embodiments of the present invention to improve the efficiency of not only an oxyfuel fired boiler but also an IGCC system such that, when integrated together in a combined system, the overall efficiency of the combined system is improved by providing further heat integration between the component parts of the combined system.

A conventional oxy-fuel combustion system uses a recycle of hot flue gas, typically at a temperature of 300° C. to 350° C. In addition, the quantity of net flue gas produced is reduced compared to a conventional power station boiler due to the absence of nitrogen and argon in the boiler system except for air in-leakage and any nitrogen/argon in the oxygen feed. Both these effects reduce the quantity of low grade heat available for condensate heating prior to de-aeration and boiler feed water heating following condensate pumping to steam delivery pressure. It has been proposed to use adiabatic compression for the oxygen plant air compressors and for the $CO_2$ compressor to allow the hot compressed air and $CO_2$ to transfer heat to the condensate and boiler feed water ("Oxy-Combustion Processes For $CO_2$ Capture From Advanced Super-Critical PF and NGCC Power Plants", Dillon et al; Proceeding on the $7^{th}$ International Conference on Greenhouse Gas Control Technologies; September 2004; Vancouver, Canada). This still leaves a deficit which must be made up by using intermediate pressure steam bled from the steam power cycle or some other means.

It is an object of preferred embodiments of the invention to provide an additional means of boiler feed water and condensate preheat by combining the coal gasification and oxy-fuel combustion systems.

One of the most widely used methods of coal gasification is a method in which partially oxidised coal is quenched from a temperature of over 1400° C. down to a temperature of, typically, 240° C. to 270° C. by direct contact with water. The gas is quenched in a section at the bottom of the gasifier and this, not only cools the gas, but washes away the bulk of the ash from the coal. The gas is then scrubbed to clean and further cool it. Preheated water can be used to increase the water content of the quenched gas which can be in the range 60-80% by volume at a typical operating pressure of 60 bar. The high content of water, with maximum preheat of the quench water, favours the shift conversion of CO and water vapour to $CO_2$ and $H_2$ with maximum conversion and minimum temperature rise.

It is an object of preferred embodiments of this invention to use a gasifier at its maximum possible pressure with coal and with quench water preheated to a maximum temperature typically within 20° C. of its boiling point preferably to ensure the best conversion of CO to $H_2$ in the shift reactor with minimum temperature rise.

It is an object of preferred embodiments of the present invention to increase the power recovery from the pressure letdown system by maximising the quench water pre-heat and the operating pressure.

The maximisation of the heating of the quench water gives a maximum quantity of steam present with the $H_2$ rich product gas from the shift conversion. This combines with the maximisation of the pressure in the system allows a maximisation in the power produced in a pressure let-down turbine which follows the shift conversion. The gas pressure is reduced to a value which, allowing for pressure loss in the downstream system, gives a suitable pressure for the $H_2$ rich gas to be used as fuel in a gas turbine following $CO_2$ and $H_2S$ removal. The use of a power turbine following CO shift allows the heat released in the exothermic CO shift reaction to be converted to power at very high efficiency.

It is a further object of preferred embodiments of the invention to allow the use of a simple low cost proven coal gasification system with water quench integrated with an oxy-fuel boiler so that the steam content of the synthesis gas is efficiently used to preheat boiler feed water and condensate from the oxy-fuel boiler and also to heat the quench water, which is recycled condensate from the cooled $H_2$ plus $CO_2$ stream.

BRIEF SUMMARY OF THE INVENTION

The invention provides a method of treating a gaseous mixture comprising $H_2$, $CO_2$ and at least one combustible gas selected from the group consisting of $H_2S$, CO and $CH_4$. The method comprises:

separating $H_2$ from the gaseous mixture to produce a separated $H_2$ gas and a crude $CO_2$ gas comprising the combustible gas(es);

combusting at least a portion of the combustible gas(es) in at least a portion of the crude $CO_2$ gas in the presence of $O_2$ to produce heat and a $CO_2$ product gas comprising combustion products of the combustible gas(es); and recovering at least a portion of the heat from at least a portion of the $CO_2$ product gas by indirect heat exchange with at least a portion of the separated $H_2$ gas or a gas derived therefrom to produce warmed $H_2$-containing gas and cooled $CO_2$ product gas.

The invention also provides apparatus for carrying out the method. In this connection, the apparatus comprises:

a separator for separating $H_2$ from the gaseous mixture to produce a separated $H_2$ gas and a crude $CO_2$ gas comprising the combustible gas(es);

a combustion reactor for combusting at least a portion of the combustible gas(es) in at least a portion of the crude $CO_2$ gas in the presence of $O_2$ to produce heat and a $CO_2$ product gas comprising combustion products of the combustible gas(es);

conduit means for feeding at least a portion of the crude $CO_2$ gas from the separator to the combustion reactor;

heat exchange means for providing indirect heat exchange between at least a portion of the $CO_2$ product gas and at least a portion of the separated $H_2$ gas or a gas derived therefrom to produce warmed $H_2$-containing gas and cooled $CO_2$ product gas;

conduit means for feeding at least a portion of the $CO_2$ product gas from the combustion reactor to the heat exchange means; and conduit means for feeding at least a portion of the separated $H_2$ gas or a gas derived therefrom from the separator to the heat exchange means.

BRIEF DESCRIPTION OF SEVERAL VIEWS OF THE DRAWINGS

The following is a description, by way of example only and with reference to the accompanying drawings, of presently preferred embodiments of the invention. In the drawings.

DETAILED DESCRIPTION OF THE INVENTION

Figure 1:
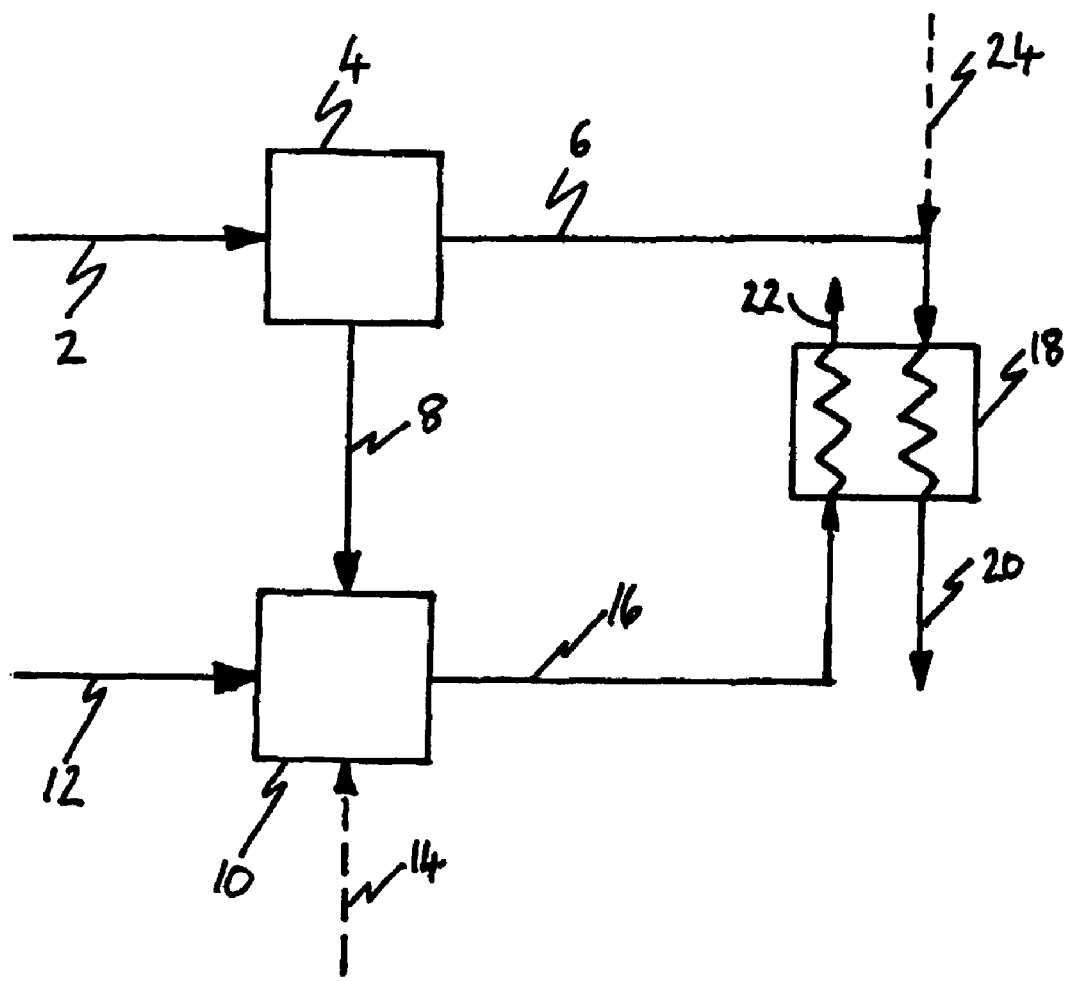
FIG. 1 is a schematic representation of a first preferred embodiment of the present invention.

According to a first aspect of the present invention, there is provided a method of treating a gaseous mixture comprising $H_2$, $CO_2$ and at least one combustible gas selected from the group consisting of $H_2S$, CO and $CH_4$, the method comprising:

separating $H_2$ from the gaseous mixture to produce a separated $H_2$ gas and a crude $CO_2$ gas comprising the combustible gas(es);

combusting at least a portion of the combustible gas(es) in at least a portion of the crude $CO_2$ gas in the presence of $O_2$ to produce heat and a $CO_2$ product gas comprising combustion products of the combustible gas(es); and recovering at least a portion of the heat from at least a portion of the $CO_2$ product gas by indirect heat exchange with at least a portion of the separated $H_2$ gas or a gas derived therefrom to produce warmed $H_2$-containing gas and cooled $CO_2$ product gas.

The present method has application in the treatment of any gaseous mixture that comprises $H_2$, $CO_2$ and at least one combustible gas selected from CO, $H_2S$ and $CH_4$. However, the method has particular application in the treatment of a gaseous mixture originating from the partial oxidation (or reforming) of a carbonaceous or hydrocarbonaceous fuel or biomass fuel. In these embodiments, the composition of the crude $CO_2$ gas will depend on a number of factors including the fuel used, the conditions for the partial oxidation and the effectiveness of the separation.

If CO is present as a combustible gas in the crude $CO_2$ gas, then the $CO_2$ product gas comprises further $CO_2$ as a combustion product. If $CH_4$ is present as a combustible gas in the crude $CO_2$ gas, then the $CO_2$ product gas comprises $H_2O$ and further $CO_2$ as combustion products. If $H_2S$ is present as a combustible gas in the crude $CO_2$ gas, then the $CO_2$ product gas comprises $SO_2$ and $H_2O$ as combustion products. In addition, if the separation is not completely effective then some $H_2$ (which is also combustible) will also be present in the crude $CO_2$ gas. If $H_2$ is present in the crude $CO_2$ gas, then the $CO_2$ product gas comprises $H_2O$ as a combustion product.

The combustion step of the method generates heat, at least a portion of which is recovered by indirect heat exchange with at least a portion of the separated $H_2$ or a gas derived therefrom. The $CO_2$ product gas is, therefore, used as a heat transfer medium. The $CO_2$ product gas usually has a low pressure, e.g. from about 1 bar to about 2 bar and, typically, about 1.3 bar. Usually, the $CO_2$ product gas consists essentially of $CO_2$ and $H_2O$, typically together with residual excess $O_2$ and, if the fuel contained sulfur, $SO_2/SO_3$.

Preferably, the method is integrated with a process for power generation using a gas turbine and, in particular, the method is preferably integrated with a gas turbine combined cycle system. The method preferably further comprises feeding at least a portion of the warmed $H_2$-containing gas as fuel to a gas turbine for the production of power. The power generated by the gas turbine may be increased (and the $NO_x$ emission level from the gas turbine may be reduced) by introducing either nitrogen ($N_2$) or $H_2O$ into the turbine fuel gas. In such embodiments, the method may further comprise:

introducing at least one diluent fluid selected from the group consisting of $N_2$ and $H_2O$ to the separated $H_2$ gas to produce $H_2$-containing gas; and using the $H_2$-containing gas for the heat recovery. For example, the amount of $N_2$ introduced is determined carefully to control $NO_x$ emission levels and produce maximum gas turbine power output. Typically, sufficient $N_2$ is added to the separated $H_2$ gas to produce a turbine fuel gas stream containing about 40 vol % to about 60 vol % $N_2$.

The gaseous mixture is treated non-selectively to separate the crude $CO_2$ gas from impure $H_2$. $H_2$ may be separated by any suitable technique. For example, $H_2$ may be separated from the gaseous mixture by an amine scrubbing process, e.g. in an MDEA unit, or by a similar chemical or physical absorption process. In such solvent based processes, $CO_2$ and $H_2S$ are absorbed, together with only minor quantities of other gaseous components (e.g. $H_2$; flammable components such as CO and $CH_4$; and any minor impurities), by the chemical or physical solvent. However, the bulk of the carbon containing flammable components (e.g. CO and $CH_4$) remains in the separated $H_2$ gas which is a $H_2$-rich gas. Combustion of this separated $H_2$ gas in a gas turbine results in the undesired emission of $CO_2$, derived from the carbon containing flammable components. It is preferable, therefore, that the flammable carbon containing components be separated from $H_2$ gas with the $CO_2$ and $H_2S$, leaving substantially pure separated $H_2$ gas.

$H_2$ is preferably separated from the gaseous mixture by a pressure swing adsorption ("PSA") process, typically using a PSA system such as a multi-bed pressure swing adsorption system. PSA is typically capable of achieving a hydrogen recovery of about 85 mol % to about 90 mol %, at about 99.999 mol % purity. The crude $CO_2$ gas contains any unrecovered $H_2$ and may also contain $CH_4$ and CO. If $H_2S$ is present in the crude $CO_2$ gas, it may provide a considerable proportion of the total combustion energy of the gaseous mixture fed to the PSA system. This is particularly true in embodiments using fuel having a high sulfur content, such a petcoke with 6 wt % sulfur.

In order to allow the use of the simple low cost PSA process for the non-selective separation, in preferred embodiments, the heat content in the low pressure PSA waste gas stream is used in an efficient manner in a downstream gas turbine combined cycle power generation system. In addition, $CO_2$ and the sulfur compound are separated selectively from this waste gas stream for separate disposal. These two objectives may be accomplished by combusting the waste gas with an excess of pure $O_2$, in which case the combustion products will be $H_2O$, $CO_2$, $SO_2$, $SO_3$ and excess $O_2$. The oxyfuel combustion may take place either in a once-through manner or with cooled flue gas recycle to moderate the combustion temperature. The $CO_2$ may be dried and compressed to pipeline pressure. The $SO_2$ and excess $O_2$ may be removed from the $CO_2$ by processes applied during the compression sequence.

The heat liberated by the oxy-fuel combustion of the PSA low pressure waste gas stream is preferably used to heat gas turbine fuel gas to the maximum allowable temperature. $N_2$ may be blended with separated $H_2$ gas to reduce the gas turbine combustion temperature (and, thus, the emission levels of $NO_x$ from the gas turbine) and increase the gas turbine power output. In this way, the bulk of the combustion thermal energy in the PSA waste gas is used as primary energy in the gas turbine at the same overall efficiency as the heat from combustion of the $H_2$ fuel. In embodiments in which an air separation unit ("ASU") provides oxygen for a gasifier and the oxy-fuel combustion, said $N_2$ may be co-produced by the ASU.

The PSA multi-bed system can operate over a pressure range from about 10 bar to about 100 bar and, preferably, in the range of 25 bar to about 35 bar, when the separated $H_2$ is used to fuel an industrial gas turbine. If $H_2$ is required for hydrotreating petroleum fractions, the operating pressure should be as high as possible to reduce or eliminate $H_2$ compression duty. This high pressure requirement would also apply if $H_2$ was required for future vehicle fuelling requirements.

The combustible gas(es) in the crude $CO_2$ gas may be combusted in any suitable combustion process. Preferably, however, the combustible gas(es) in the crude $CO_2$ gas are combusted in an oxyfuel combustion process using an excess of oxidant gas consisting essentially of $O_2$ and, optionally, recycled $CO_2$ product gas. If the gaseous mixture is produced from a carbonaceous fuel such as coal, the $CO_2$ product gas would further comprises $CO_2$, $H_2O$, $SO_2$ and $SO_3$ together with some excess combustion $O_2$.

A fuel selected from the group consisting of carbonaceous fuel, hydrocarbonaceous fuel and biomass fuel may be combusted in the oxyfuel combustion process. The combustible gas(es) in the crude $CO_2$ gas are then used as "overfuel" in the oxyfuel fired water boiler. An example of a preferred oxyfuel combustion process is a pulverized coal fired water boiler in a power station. Thus, in preferred embodiments, a gaseous mixture arising from the treatment of a primary fuel such as carbonaceous fuel, hydrocarbonaceous fuel or biomass fuel by a process such as partial oxidation or reforming, if subjected to a separation process to separate substantially pure $H_2$, would provide a crude $CO_2$ stream that further contains $H_2S$, CO and $CH_4$ which can be combusted as an additional fuel gas firing stream in a pulverized coal fired boiler in a power station. If the boiler has been converted for oxy-fuel firing, the $CO_2$ and $SO_x$ combustion products would be captured for disposal.

The method has particular application in embodiments in which the oxyfuel combustion process is the combustion of carbonaceous fuel, e.g. pulverized coal, in a water boiler producing steam for expansion to generate power. In these embodiments, the method may further comprises:

pre-heating boiler feed water by indirect heat exchange with the gaseous mixture to produce cooled gaseous mixture and preheated boiler feed water; and feeding at least a portion of the pre-heated boiler feed water to the water boiler to produce steam for power generation. The method may, thus, be further integrated with a combined cycle power generation system. In preferred embodiments, the gaseous mixture follows CO shift and optional power recovery in a pressure let down turbine.

The preferred embodiments comprise an oxyfuel fired water boiler producing steam for power generation, e.g. as in a pulverized coal fired power station, integrated with an IGCC system producing power from a gas turbine. Such embodiments allow more efficient heat integration between the oxyfuel fired water boiler and the IGCC system which results in less steam being required for preheating boiler feed water and condensate in the pulverized coal fired power station. Depending on output of the gas turbine relative to the pulverized coal fired boiler, exhaust from the gas turbine may be used to preheat boiler feed water and also to produce high pressure steam. No separate steam turbine and associated equipment would be needed. All of the steam system would be common to both the IGCC system and the PF coal fired boiler. Higher efficiency is thereby achievable and capital costs are reduced.

The invention may be used with a partial oxidation reactor or reformer producing synthesis gas, integrated with an IGCC system. CO in the synthesis gas is usually converted to produce $H_2$ and $CO_2$ by reaction with $H_2O$ over a shift conversion catalyst. $H_2$ is separated from $CO_2$ and then fed as fuel to the combustion chamber in a gas turbine to produce power.

An integrated process comprising the combination of coal based IGCC with the combustion of coal in a pulverized coal oxyfuel boiler significantly increases the overall efficiency of power generation compared to either of the current best methods used separately. In addition, the capital cost of the power generation equipment with $CO_2$ capture is significantly reduced compared to either of the two current best methods used separately.

One particular advantage of the present invention is that at least a portion (and usually all) of the possible harmful trace components will be oxidized and converted to soluble or inactive forms which can be removed downstream, often more easily than the harmful trace components themselves.

The $CO_2$ product gas may comprise a number of contaminants. The identity and amount of the contaminants depends on the nature of the fuel used to produce the gaseous mixture, the conditions of the combustion step and the effectiveness of the separation. For example, the use of coal as a fuel produces $H_2S$ which, when combusted, produces $SO_2$ and $SO_3$ (or "$SO_x$"). Excess $O_2$ in the combustion step could result in $O_2$ as a contaminant. In addition, $N_2$ and Ar, originating as impurities in the $O_2$ used in the combustion, could also be present as contaminants in the $CO_2$ product gas. However, one advantage of the use of an oxyfuel combustion process is that $N_2$ and Ar are largely eliminated from process except for the quantities present with the $O_2$ feed and also as a result of air leaking into the process. The $N_2$ and Ar components are termed "inert" components.

Where the $CO_2$ product gas comprises one or more contaminants selected from the group consisting of $SO_2$, $SO_3$ and $NO_x$, the method may further comprise the removal of at least a portion of the contaminant(s) from the $CO_2$ product gas, by:

washing $CO_2$ product gas with water to produce cooled, $SO_3$-free, $CO_2$ product gas;

maintaining the cooled, $SO_3$-free, $CO_2$ product gas at elevated pressure(s) in the presence of $O_2$ and water and, when $SO_2$ is to be removed, $NO_x$, for a sufficient time to convert $SO_2$ to sulfuric acid and/or $NO_x$ to nitric acid; and separating the sulfuric acid and/or nitric acid from the cooled, $SO_3$-free, $CO_2$ product gas to produce $SO_x$-free, $NO_x$-lean $CO_2$ gas.

The term "free" in the context of "$SO_3$-free" or "$SO_x$-free" means that at least substantially all (and usually essentially all or preferably all) $SO_3$ or $SO_x$ has been removed.

At least a portion of the $SO_x$-free, $NO_x$-lean $CO_2$ gas may then be dried, purified to remove "inert" components if necessary, and compressed to a pipeline pressure of from about 80 bar to about 250 bar.

Typically, at least substantially all (and usually all) of any $SO_x$ contaminant and the bulk, usually about 90%, of any $NO_x$ is removed.

The $CO_2$ product gas is usually produced at a pressure of from about 1 bar to about 2 bar, e.g. typically 1.3 bar, and may be compressed to the elevated pressure. The elevated pressure is usually at least about 3 bar and preferably from about 10 bar to about 50 bar. In preferred embodiments, $SO_2$ and $NO_x$ removal takes place at stages within a $CO_2$ compression train where the gas has been cooled in the compressor intercooler or aftercooler. At least a portion of the compression is preferably adiabatic.

$SO_2$ is removed as $H_2SO_4$ and NO and $NO_2$ are removed as $HNO_3$ provided that there is sufficient contact time between the gaseous components and the liquid water after elevation of the pressure of the $CO_2$ product gas. Contact time (or "hold-up") determines the degree of conversion of $SO_2$ to $H_2SO_4$ and $NO_x$ to $HNO_3$. A total "hold-up" time of no more than 60 seconds is usually sufficient for maximum conversion of $SO_2/NO_x$.

Counter current gas/liquid contact devices such as columns or scrub towers allow intimate mixing of water with $SO_x$ and then with $NO_2$ to remove continuously these components from the gas thereby allowing reactions to proceed until at least substantially all $SO_x$ is removed, together with the bulk of the $NO_x$. Such devices are suitable for providing the required contact time for the conversion(s). No $HNO_2$ or $HNO_3$ will be formed until all of the $SO_2$ has been consumed.

The $O_2$ required for the conversions may be added although an amount of $O_2$ is usually present in the $CO_2$ in any event, for example, from an excess of $O_2$ used in an oxyfuel combustion process. Water is usually present in the $CO_2$, for example, having been produced in the combustion process. In any event, water will be added during washing.

$CO_2$ product gas is usually washed to remove $SO_3$ in a counter current gas/liquid contact device such as a scrubber. The cooled, $SO_3$-free, $CO_2$ product gas is usually washed with water in at least one further counter current gas/liquid contact device to produce the $SO_x$-free, $NO_x$-lean $CO_2$ gas and an aqueous sulfuric acid solution and/or an aqueous nitric acid solution. The aqueous acid solutions are usually dilute. At least a portion of the or each aqueous solution is preferably recycled to the or each respective gas/liquid contact device. Where the contact device is a column or scrub tower, the solution is recycled to the top of the column or tower. The recycle portion(s) of the or each aqueous solution are usually pumped to higher pressure(s) to produce pumped solution(s) which are then cooled before recycling.

In preferred embodiments in which cooled, $SO_3$-free $CO_2$ product gas comprises $SO_2$ and $NO_x$, the method comprises converting $SO_2$ to sulfuric acid at a first elevated pressure and converting $NO_x$ to nitric acid at a second elevated pressure which is higher than the first elevated pressure. A portion of the $NO_x$ may be converted to nitric acid at the first elevated pressure. For example, if $SO_2$ feed concentration is sufficiently low, there could be more nitric acid than sulfuric acid produced at the first elevated pressure.

Thus, in preferred embodiments, the method usually comprises:
- washing $CO_2$ product gas with water in a counter current gas/liquid contact device to produce cooled, $SO_3$-free, $CO_2$ product gas;
- compressing at least a portion of the cooled, $SO_3$-free, $CO_2$ product gas to the first elevated pressure;
- washing $SO_3$-free, $CO_2$ product gas with water at the first elevated pressure in a first further counter current gas/liquid contact device to produce $SO_x$-free $CO_2$ gas and an aqueous sulfuric acid solution;
- compressing at least a portion of the $SO_x$-free carbon dioxide gas to the second elevated pressure; and
- washing at least a portion of the $SO_x$-free carbon dioxide gas with water at the second elevated pressure in a second further counter current gas/liquid contact device to produce $SO_x$-free, $NO_x$-lean carbon dioxide gas and an aqueous nitric acid solution. At least a portion of the aqueous sulfuric acid solution is usually recycled to the first gas/liquid contact device, optionally after pumping and/or cooling. At least a portion of the aqueous nitric acid solution is usually recycled to the second gas/liquid contact device, optionally after pumping and/or cooling. Nitric acid may be reacted to produce NO and $NO_2$ which may be recycled in embodiments where $NO_x$ levels in the crude $CO_2$ gas are low or absent.

The first elevated pressure is usually from about 10 bar to about 20 bar and is preferably about 15 bar. Where the cooled, $SO_3$-free, $CO_2$ product gas is compressed to the first elevated pressure, such compression is preferably adiabatic, usually with heat recovery to the power generation system.

The second elevated pressure is usually from about 25 bar to about 35 bar and is preferably about 30 bar.

The contact time of the relevant $CO_2$ gas with water in the gas/liquid contact device(s) is known as the residence time. The $SO_3$-free, $CO_2$ product gas preferably has a residence time in the first further gas/liquid contact device of from about 2 seconds to about 20 seconds. The $SO_x$-free $CO_2$ gas preferably has a residence time in the second further gas/liquid contact device of from about 2 seconds to about 20 seconds.

One of the advantages of preferred embodiments of the present invention is that the method works with concentrations of $NO_x$ as low as 300 ppm. The concentration of $NO_x$ in the $CO_2$ product gas is preferably from about 300 ppm to about 10,000 ppm. In embodiments where the $CO_2$ product gas does not comprise $NO_x$ as a contaminant, the method further comprises adding to the $CO_2$ at least the minimum amount of $NO_x$ required to convert said $SO_2$ to sulfuric acid.

In those embodiments, the amount of $NO_x$ added is preferably from about 300 ppm to about 10,000 ppm.

The $HNO_3$ separated from the $CO_2$ product gas can then be converted to NO and $NO_2$ and recycled back to the system.

The temperature at which the $CO_2$ product gas is maintained at said elevated pressure(s) to convert $SO_2$ to sulfuric acid and/or $NO_x$ to nitric acid is usually no more than about 80° C. and preferably no more than about 50° C. In preferred embodiments, the temperature is no less than about 0° C. and is preferably from about 0° C. to 50° C. Most preferably, the temperature is near ambient, for example, about 30° C.

The $SO_x$-free, $NO_x$-lean $CO_2$ gas (or the $CO_2$ product gas if no $SO_x/NO_x$ to remove) may then be stored in geological formations or used in enhanced oil recovery. In preferred embodiments, the gas is dried in a desiccant drier, and then cooled to a temperature close to its triple point where "inerts" such as $O_2$, $N_2$ and Ar, are removed in the gas phase. This process allows the $CO_2$ loss with the inert gas stream to be minimised by fixing the feed gas pressure at an appropriate high level in the range of about 20 bar to about 40 bar. A suitable "inerts" removal process is described in a paper titled "Oxyfuel conversion of heaters and boilers for $CO_2$ capture" (Wilkinson et al; Second National Conference on Carbon Sequestration; May 5-8, 2003; Washington, D.C.), the disclosure of which is incorporated herein by reference. This process leads to $CO_2$ purities of about 95 mol % to about 98 mol % and $CO_2$ recoveries of about 90 mol % to about 95 mol %.

If it is required that excess $O_2$ should be removed from the $SO_x$-free, $NO_x$-lean $CO_2$ gas (e.g. if the $CO_2$ is to be used for enhanced oil recovery), then the compressed $CO_2$ can be mixed with a suitable quantity of $H_2$ and passed over a platinum or palladium catalyst to convert the $O_2$ to $H_2O$. This step will be carried out downstream of the $SO_x/NO_x$ removal steps and immediately upstream of the $CO_2$ drying step. The catalytic conversion will typically be carried out at a pressure of about 20 bar to about 40 bar.

A further embodiment involving separating pure $CO_2$ from PSA offgas involves using of the "inerts" separation described in the Wilkinson reference and taking the inerts gas stream (which typically consists of about 25 mol % $CO_2$, 40 mol % $H_2$, 15 mol % CO with the remainder being composed of $O_2$, $N_2$ and Ar and which is typically at a pressure of about 20 bar to about 30 bar) and process the gas stream to separate more recoverable $H_2$. The gas is first heated to about 300° C., adding steam, and passing the gas through a shift catalyst to convert CO and water to $CO_2$ and $H_2$. The $H_2$ rich gas is then passed through a second PSA, which separates a second quantity of pure $H_2$ leaving a low pressure $CO_2$ rich waste gas stream which can be combusted on a once-through basis with pure $O_2$ to produce heat for preheating the feed to the gas turbine.

Where the oxyfuel combustion process uses coal as fuel, mercury will be present in the $CO_2$ product gas based on typical coal compositions. A further advantage of these embodiments of the present invention is that, as nitric acid is produced, any elemental mercury or mercury compounds present in the $CO_2$ product gas will also be removed because elemental mercury in the vapor phase will be converted to mercuric nitrate and mercury compounds react readily with nitric acid. Typical nitric acid concentrations in the process will be sufficient to remove all mercury from the $CO_2$ stream, either by reaction or dissolution.

Whilst the $H_2$-containing gas is preferably used as fuel in the combustor of a gas turbine, at least a portion of the $H_2$-containing gas may be used for chemical processes such as hydro-treating or de-sulfurizing petroleum fractions and ammonia production or may be liquefied to produce liquid hydrogen.

The method preferably further comprises producing heat and at least a portion of the $H_2$ in the gaseous mixture by reacting CO with $H_2O$ in a shift conversion reaction. The shift conversion reaction is usually catalyzed. Where the gaseous mixture comprises gases containing sulfur, the shift catalyst must be sulfur tolerant. Any COS or $CS_2$ would be converted simultaneously to $H_2S$ and $CO_2$.

At least a portion of the heat generated in the CO plus $H_2O$ shift conversion reaction may be used to preheat boiler feed water. The pressure of the gaseous mixture may be reduced with power recovery in a hot gas expander prior to cooling with boiler feed water.

At least a portion of the CO may be produced as a synthesis gas mixture with $H_2$ by partially oxidizing or reforming a fuel selected from the group consisting of carbonaceous fuel, hydrocarbonaceous fuel and biomass fuel. For example, hydrocarbonaceous fuel (e.g. natural gas) may be partially oxidized in the presence of $O_2$ (e.g. in air, pure $O_2$ or impure $O_2$) to produce the synthesis gas. In this example, the synthesis gas produced usually also comprises $CH_4$.

In another example, the carbonaceous fuel (e.g. coal) may be gasified to produce a synthesis gas mixture comprising CO and $H_2$. The gasification is exothermic and, thus, at least a portion of the heat generated is preferably recovered. In the latter embodiment, the method may further comprise quenching the gasification using water after the water is warmed by indirect heat exchange against the gaseous mixture. At least a portion of the quench water may be condensed and separated from the gaseous mixture before warming. The method may, thus, be still further integrated with an IGCC system.

In embodiments where the CO is produced as a synthesis gas mixture with $H_2$ by the gasification of carbonaceous fuel, an IGCC system may be used to produce the fuel for the gas turbine, thereby allowing further heat integration. One advantage would be that waste heat from the gas turbine may be used to pre-heat boiler feedwater and condensate from an oxyfuel pulverized fuel coal-fired power station. Little or no steam would need to be raised in the gas turbine exhaust heat recovery system. There would be no separate steam turbine power system provided with the gas turbine.

In embodiments where the gaseous mixture is produced from the shift conversion reaction at the highest possible synthesis gas production pressure, the method preferably further comprises reducing the pressure of gaseous mixture to a pressure which favors the use of separated $H_2$ gas or $H_2$-containing gas derived therefrom in a gas turbine. The reduced pressure gaseous mixture is usually used to pre-heat boiler feed water by indirect heat exchange before separation.

In a preferred embodiment, the method comprises:
partially oxidizing or reforming a fuel selected from the group consisting of carbonaceous fuel, hydrocarbonaceous fuel and biomass fuel, to produce synthesis gas;
reacting at least a portion of the CO in the synthesis gas with $H_2O$ in a shift conversion reaction to produce a gaseous mixture comprising $H_2$, $CO_2$ and at least one combustible gas selected from the group consisting of $H_2S$, CO and $CH_4$;
separating $H_2$ from the gaseous mixture to produce a separated $H_2$ gas and a crude $CO_2$ gas comprising the combustible gas(es);
combusting at least a portion of the combustible gas(es) in the crude $CO_2$ gas in an oxyfuel combustion process using an excess of oxidant gas consisting essentially of $O_2$ and, optionally, at least one fuel selected from the group consisting of carbonaceous fuel, hydrocarbonaceous fuel and biomass fuel, to produce heat and a $CO_2$ product gas comprising combustion products of the combustible gas(es):
recycling a portion of the $CO_2$ product gas as feed to the oxyfuel combustion process;
recovering at least a portion of the heat from at least a portion of the $CO_2$ product gas by indirect heat exchange with at least a portion of the separated $H_2$ gas, the separated $H_2$ gas optionally comprising at least one further gas selected from the group consisting of $N_2$ and $H_2O$, to produce warmed turbine fuel gas and cooled $CO_2$ product gas; and
feeding warmed turbine fuel gas to a gas turbine for power generation. The synthesis gas is preferably produced by the gasification of coal or by the partial oxidation (or reforming) of natural gas.

The combination of the pre-combustion decarbonization and a pulverized coal fired water boiler power station results in an increase in the thermal efficiency of the combined system compared to the operation of the two systems separately, from about 36% to above 40% (LHV) and can also result in a lower total capital cost for the combined system compared to systems based either on oxy-fuel alone or an IGCC alone.

Further optional features of the first aspect of the present invention include:
catalytically combusting some product $H_2$ in the presence of the excess $O_2$ in the $CO_2$ product gas to remove the excess $O_2$; and
if combustion of the crude $CO_2$ gas does not provide sufficient heating duty within the synthesis gas generation flowsheet, using natural gas as an additional fuel in the combustor to produce further heating duty. A portion of the combustor flue gas may have to be recycled to the combustor to control the temperature within the combustor.

According to a second aspect of the present invention, there is provided apparatus for treating a gaseous mixture comprising $H_2$, $CO_2$ and at least one combustible gas selected from the group consisting of $H_2S$, CO and $CH_4$, the apparatus comprising:
a separator for separating $H_2$ from the gaseous mixture to produce a separated $H_2$ gas and a crude $CO_2$ gas comprising the combustible gas(es);
a combustion reactor for combusting at least a portion of the combustible gas(es) in at least a portion of the crude $CO_2$ gas in the presence of $O_2$ to produce heat and a $CO_2$ product gas comprising combustion products of the combustible gas(es);
conduit means for feeding at least a portion of the crude $CO_2$ gas from the separator to the combustion reactor;
heat exchange means for providing indirect heat exchange between at least a portion of the $CO_2$ product gas and at least a portion of the separated $H_2$ gas or a gas derived therefrom to produce warmed $H_2$-containing gas and cooled $CO_2$ product gas;
conduit means for feeding at least a portion of the $CO_2$ product gas from the combustion reactor to the heat exchange means; and
conduit means for feeding at least a portion of the separated $H_2$ gas or a gas derived therefrom from the separator to the heat exchange means.

The apparatus may be adapted and/or constructed to carry out any viable combination of the preferred features of the method discussed above.

Any suitable heat exchange means may be used. An example of a suitable heat exchange means is a heat exchanger such as a plate-fin heat exchanger. Another example of suitable heat exchange means is heat exchange areas within the combustion reactor.

The apparatus may further comprise:
a gas turbine for producing power; and
conduit means for feeding warmed $H_2$-containing gas as fuel from the heat exchange means to the gas turbine. In these embodiments, the apparatus may further comprise means for introducing at least one diluent fluid selected from the group consisting of $N_2$ and $H_2O$ to the separated $H_2$ gas upstream of the heat exchange means to produce $H_2$-containing gas. Suitable means may comprise further conduit means and a conduit junction or manifold in fluid communication with the conduit means feeding the separated $H_2$ gas to the heat exchange means. Flow of the $N_2$ and/or $H_2O$ may be controlled using a flow controller such as a valve system.

The separator may be an amine scrubbing system, e.g. using an MDEA unit, or a system for any similar chemical or physical absorption process. In preferred embodiments, however, the separator is a PSA system such as a multi-bed pressure swing adsorber.

The combustion reactor is preferably an oxyfuel combustion reactor. In such embodiments, the apparatus further comprising:
conduit means for feeding an oxidant gas consisting essentially of $O_2$ to the oxyfuel combustion reactor; and
the apparatus optionally further comprises:
conduit means for recycling a portion of the $CO_2$ product gas as feed to the oxyfuel combustion reactor.

The oxyfuel combustion reactor is preferably a pulverized coal-fuelled water boiler for producing steam for expansion to generate power. In these embodiments, the apparatus may further comprise:
heat exchange means for providing indirect heat exchange between the gaseous mixture and boiler feed water thereby producing cooled gaseous mixture and preheated boiler feed water;
conduit means for feeding the gaseous mixture to the heat exchange means;
conduit means for feeding cooled gaseous mixture from the heat exchange means to the separator;
conduit means for feeding boiler feed water to the heat exchange means; and
conduit means for feeding preheated boiler feed water from the heat exchange means to the water boiler.

By selection of gas turbine and boiler size, it is possible to heat the majority of the boiler feed water required by an oxyfuel boiler, thereby reducing or even eliminating the need for bleed steam from an oxyfuel steam turbine system.

The apparatus may further comprise any suitable means for removal of contaminant(s) from the $CO_2$ product gas. Where one or more contaminants selected from the group consisting of $SO_2$, $SO_3$ and $NO_x$ are to be removed, the apparatus may further comprise:
a counter current gas/liquid contact device for washing said $CO_2$ product gas with water to produce cooled, $SO_3$-free, $CO_2$ product gas;
a compressor for elevating the pressure of cooled, $SO_3$-free, $CO_2$ product gas;
conduit means for feeding cooled, $SO_3$-free, $CO_2$ product gas from the gas/liquid contact device to the compressor;
at least one further counter current gas/liquid contact device for washing said $SO_3$-free, $CO_2$ product gas with water at elevated pressure in the presence of $O_2$ and, when $SO_2$ is to be removed, $NO_x$, for a sufficient time to convert $SO_2$ to sulfuric acid and/or $NO_x$ to nitric acid;
conduit means for feeding $SO_3$-free, $CO_2$ product gas at elevated pressure from said compressor to the or each respective gas/liquid contact device; and
conduit means for recycling aqueous sulfuric acid solution and/or aqueous nitric acid solution to the or each respective gas/liquid contact device.

In preferred embodiments, the apparatus comprises:
a counter current gas/liquid contact device for washing $CO_2$ product gas with water to produce cooled, $SO_3$-free, $CO_2$ product gas;
a first compressor for elevating the pressure of cooled, $SO_3$-free, $CO_2$ product gas to a first elevated pressure;
conduit means for feeding cooled, $SO_3$-free, $CO_2$ product gas from the gas/liquid contact device to the first compressor;
a first further counter current gas/liquid contact device for washing the $SO_3$-free, $CO_2$ product gas with water at the first elevated pressure for a sufficient time to produce $SO_x$-free $CO_2$ gas and an aqueous sulfuric acid solution;
conduit means for feeding the $SO_3$-free, $CO_2$ product gas at the first elevated pressure from the first compressor to the first further gas/liquid contact device; and
conduit means for recycling aqueous sulfuric acid solution to the first further gas/liquid contact column;
a second compressor for compressing at least a portion of the $SO_x$-free $CO_2$ gas to a second elevated pressure which is higher than the first elevated pressure;
a second further counter current gas/liquid contact device for washing the $SO_x$-free $CO_2$ gas with water at the second elevated pressure for a sufficient time to produce $SO_x$-free, $NO_x$-lean $CO_2$ gas and an aqueous nitric acid solution;
conduit means for feeding the $SO_x$-free $CO_2$ gas at the second elevated pressure from the second compressor to the second further gas/liquid contact device; and
conduit means for recycling aqueous nitric acid solution to the second gas/liquid contact device. In these embodiments, the first and second compressors may be stages of a $CO_2$ compression train.

Any suitable apparatus may be used to produce $H_2$ in the gaseous mixture. However, the apparatus preferably further comprises:
a shift conversion reactor for reacting CO with $H_2O$ to produce at least a portion of the $H_2$ in the gaseous mixture;
conduit means for feeding CO and, separately or as a combined stream, $H_2O$ to the shift conversion reactor; and
conduit means for feeding gaseous mixture from the shift conversion reactor to the separator. One advantage in producing $H_2$ using shift conversion of CO is that the reaction is exothermic and, thus, further heat is available for recovery, e.g. by pre-heating feed water for a water boiler and/or condensate from a convection section of a pulverized fuel coal fired water boiler.

In these embodiments, the apparatus may further comprise:
a reactor selected from the group consisting of a partial oxidation reactor and a reformer for producing synthesis gas comprising CO from a fuel selected from the group consisting of carbonaceous fuel, hydrocarbonaceous fuel and biomass fuel; and
conduit means for feeding the CO from the reactor to the shift conversion reactor.

The reactor may be an autothermal reformer ("ATR") or a gasifier. Where the reactor is a gasifier, the apparatus may further comprise:

heat exchange means for providing indirect heat exchange between water and the gaseous mixture to produce warmed water and cooled gaseous mixture;

conduit means for feeding gaseous mixture to the heat exchange means;

conduit means for feeding cooled gaseous mixture from the heat exchange means to the separator;

conduit means for feeding water to the heat exchanger; and conduit means for feeding the warmed water from the heat exchanger to the gasifier as quench water.

The apparatus may further comprise:

a pressure letdown turbine for reducing the pressure of the gaseous mixture produced in the shift conversion reactor from the highest possible synthesis gas production pressure to a pressure which favors the use of separated $H_2$ gas or $H_2$-containing gas derived therefrom in a gas turbine;

conduit means for feeding gaseous mixture from the shift conversion reactor to the pressure letdown turbine; and conduit means for feeding reduced pressure gaseous mixture from the pressure letdown turbine to the separator. The apparatus usually further comprises heat exchange means for providing indirect heat exchange between water and reduced pressure gaseous mixture upstream of the separator. The apparatus then alternatively comprises:

conduit means for feeding reduced pressure gaseous mixture from the pressure letdown turbine to the heat exchange means;

conduit means for feeding cooled gaseous mixture from the pressure letdown turbine to the separator;

conduit means for feeding water to the heat exchange means; and conduit means for removing warmed water from the heat exchange means. The warmed water may be used elsewhere in the process, for example, for quenching a gasification reaction.

The pressure let down turbine may be a power producing turbine.

In preferred embodiments, the apparatus comprises:

a reactor selected from the group consisting of a partial oxidation reactor and reformer for producing synthesis gas comprising CO from a fuel selected from the group consisting of carbonaceous fuel, hydrocarbonaceous fuel and biomass fuel $H_2$;

a shift conversion reactor for reacting at least a portion of the CO with $H_2O$ to produce a gaseous mixture comprising $H_2$, $CO_2$ and at least one combustible gas selected from the group consisting of $H_2S$, CO and $CH_4$;

conduit means for feeding synthesis gas from the reactor to the shift conversion reactor;

a separator for separating $H_2$ from the gaseous mixture to produce a separated $H_2$ gas and a crude $CO_2$ gas comprising the combustible gas(es);

conduit means for feeding the gaseous mixture from the shift conversion reactor to the separator;

an oxyfuel combustion reactor for combusting at least a portion of the combustible gas(es) in the crude $CO_2$ gas in an oxyfuel combustion process using an excess of oxidant gas consisting essentially of $O_2$ and, optionally, at least one fuel selected from the group consisting of carbonaceous fuel, hydrocarbonaceous fuel and biomass fuel, to produce heat and a $CO_2$ product gas comprising combustion products of the combustible gas(es);

conduit means for feeding the crude $CO_2$ gas from the separator to the oxyfuel combustion reactor;

conduit means for feeding said oxidant gas to the oxyfuel combustion reactor;

conduit means for recycling a portion of the $CO_2$ product gas as feed to the oxyfuel combustion reactor;

heat exchange means for providing indirect heat exchange between $CO_2$ product gas and separated $H_2$ gas or a gas derived therefrom to produce warmed turbine fuel gas and cooled $CO_2$ product gas;

conduit means for feeding $CO_2$ product gas from the combustion reactor to the heat exchange means;

conduit means for feeding separated $H_2$ gas from the separator to the heat exchange means;

a gas turbine for producing power; and conduit means for feeding warmed turbine fuel gas from the heat exchange means to the gas turbine.

Referring to FIG. 1, a stream 2 of a gaseous mixture comprising $H_2$, $CO_2$ and at least one combustible gas selected from the group consisting of $H_2S$, CO and $CH_4$, is fed to a separator 4 which separates the gaseous mixture into separated $H_2$ gas and crude $CO_2$ gas comprising said combustible gas(es).

A stream 8 of the crude $CO_2$ gas is fed to a combustion reactor 10 where it is combusted in the presence of $O_2$ fed as at least a component of stream 12 to the reactor 10 to produce heat and a $CO_2$ product gas comprising combustion product(s) of the combustible gas(es). A stream 14 of carbonaceous or hydrocarbonaceous fuel or biomass fuel is optionally also fed to the reactor 10 for combustion.

A stream 16 of $CO_2$ product gas is removed from the reactor 10 and fed to a heat exchanger 18. A stream 6 of separated $H_2$ gas is fed from the separator 4 to the heat exchanger 18 where it recovers heat from the $CO_2$ product gas by indirect heat exchange to produce a stream 20 of warmed $H_2$ gas and a stream 22 of cooled $CO_2$ product gas.

In certain examples of the embodiment depicted FIG. 1, the stream 20 of warmed $H_2$ gas is used as fuel in a gas turbine (not shown). In these examples, a stream 24 of diluent gas ($N_2$ or $H_2O$) may be added to stream 6 prior to heating in heat exchanger 18.

Figure 2:
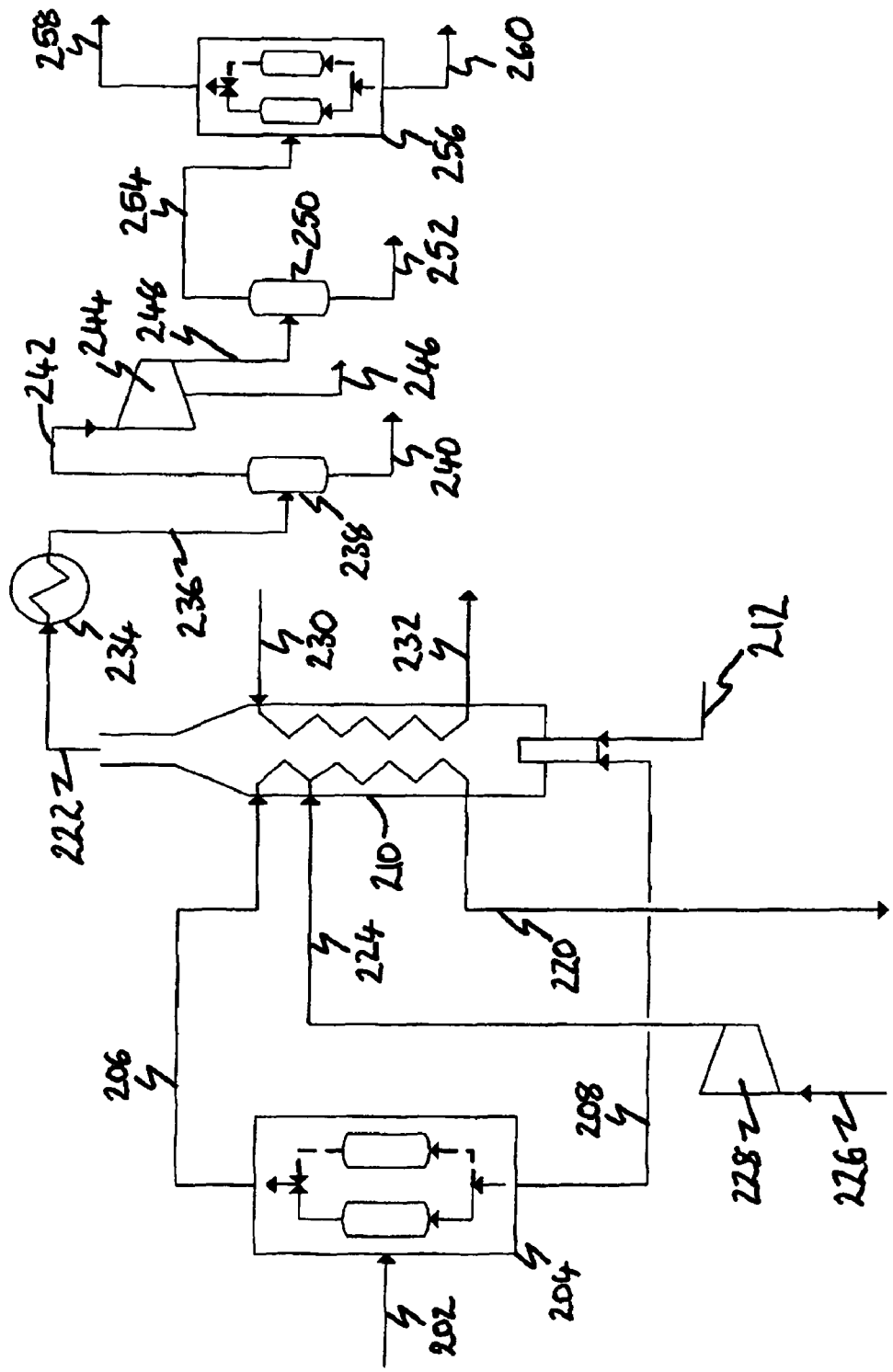
FIG. 2 is a schematic representation of a second preferred embodiment of the present invention.

Referring to FIG. 2, an ATR (not shown) produces synthesis gas which is fed to a shift reactor (not shown) in which CO in the synthesis gas reacts with $H_2O$ over a catalyst to produce $CO_2$ and further $H_2$. The gaseous mixture (comprising predominantly $H_2$ and $CO_2$) is cooled (not shown) to 40° C. and any condensed water removed (not shown). A stream 202 of cooled, dry gaseous mixture is fed to an $H_2$ PSA 204 in which it is separated into separated $H_2$ gas at high purity (over 99 mol. % and usually 99.999 mol. %) and a crude $CO_2$ gas ("offgas"). The separated $H_2$ gas contains at least 90 mol % of the $H_2$ in the gaseous mixture of stream 202 and the crude $CO_2$ gas contains the remaining components, together with the remaining $H_2$.

A stream 208 of the crude $CO_2$ gas is fed to an oxyfuel combustor 210 where it is combusted with a stream 212 of pure $O_2$ to produce heat and a $CO_2$ product gas consisting mostly of $CO_2$ and $H_2O$, together with some "inerts" and excess $O_2$.

Advantageously, at least a portion of the heat produced in the combustion is recovered. In this connection, a stream 206 of separated $H_2$ gas is heated by indirect heat exchange against the hot $CO_2$ product gas produced in the combustor 210. In the embodiment depicted in FIG. 2, the separated $H_2$ gas is to be used as gas turbine fuel. Thus, a stream 226 of $N_2$, taken from the oxygen plant (not shown) supplying $O_2$ to the combustor 210, is compressed to about 23 bara in compressor 228 to produce a stream 224 of compressed $N_2$. The separated $H_2$ gas is heated to a temperature close to the temperature of the compressed $N_2$ and then the stream 224 of compressed $N_2$ is mixed with the stream 206 of warming $H_2$ gas and the resultant combined stream is heated to about 350° C. in the combustor 210 to produce a stream 220 of pre-heated $H_2$-rich fuel for the gas turbine (not shown).

Excess heat from the combustion can be recovered by heating other streams within the flowsheet. For example, the natural gas feed to the ATR (not shown) may also be preheated by indirect heat exchange against the hot $CO_2$ product gas. In the present case, however, steam at 150 bar is raised to integrate with the steam system (not shown) on the heat recovery system (not shown) of the gas turbine (not shown). Depiction of the steam raising step has been simplified in FIG. 2. In this connection, a stream 230 of water is heated by indirect heat exchange against the $CO_2$ product gas to produce a stream 232 of superheated steam. In reality, other equipment (not shown), such as a deaerator, would be required but would not change the overall heat and mass balance significantly.

Combustor 210 is designed to be air-tight to prevent any ingress of air that would reduce the purity of the $CO_2$ product gas. It may also be desirable to operate combustor 210 at elevated pressures, such as about 1 to about 5 bara, to reduce the size of the heat exchange areas. This would require compressing the "offgas" from the PSA and using higher pressure $O_2$ but would then require less compression downstream (e.g. in compressor 244—see below).

A stream 222 of cooled $CO_2$ product gas leaves the combustor 210 and is further cooled against cooling water (not shown) in heat exchanger 234 to produce a stream 236 of further cooled $CO_2$ product gas. Stream 236 is fed to a first separator 238 to separate condensed water from the $CO_2$ product gas. Condensed water is removed as stream 240. A stream 242 of $CO_2$ product gas is fed to an inter-cooled, multistage compressor 244 where it is compressed to a pressure of about 30 barg. Water, condensed during the inter-stage cooling, is removed as stream 246. A stream 248 of compressed $CO_2$ product gas is fed to a second separator 250 where further condensed water is removed as stream 252.

A stream 254 of 30 bar $CO_2$ is then fed to a multi-bed desiccant drier 256 where it is dried to produce a stream 258 of dried $CO_2$ product gas which is further compressed in a $CO_2$ compression train (not shown) for pipeline transportation. Water is removed from the desiccant drier 256 as stream 260.

In an alternative arrangement of the embodiment depicted in FIG. 2, synthesis gas is produced by the gasification of coal. In this arrangement, the stream 222 of cooled $CO_2$ product gas will comprise $SO_x$ contaminants. $SO_3$ is removed by washing the $CO_2$ product gas with water. This wash step has the added benefit of further cooling the $CO_2$ product gas. The $SO_2$ (and $NO_x$) contaminants are removed by the relevant processes described above at inter-stages of the compression (not shown).

Three computer simulations have been carried out in respect of the present invention. Each simulation has been based broadly on the flowsheet depicted in FIG. 2. However, each simulation differs from the other two in the respects described below. The results of the computer simulations are given in the form of the heat and mass balance information provided in Tables I to III.

Example 1

In Example 1, the computer simulated the arrangement of the process depicted in FIG. 2 in which synthesis gas is produced from natural gas in an ATR (not shown). The synthesis gas is cooled to 40° C. and condensed water removed prior to being fed as stream 202 to the $H_2$ PSA 204 which is operating to produce pure (100 mol. %) $H_2$ at 90 mol. % recovery.

The results of the simulation in Example 1 are provided in Table I.

TABLE I

| | | Stream Number | | | | | | | | | |
|---|---|---|---|---|---|---|---|---|---|---|
| | | 202 | 206 | 208 | 226 | 224 | 220 | 212 | 230 | 232 | 222 |
| Temperature | ° C. | 40.00 | 40.00 | 40.00 | 15.00 | 96.00 | 350.00 | 200.00 | 35.00 | 500.00 | 69.44 |
| Pressure | bar a | 27.5 | 27.5 | 27.5 | 3 | 23 | 23 | 1.5 | 150 | 150 | 1.5 |
| Flow | kg/s | 61.25 | 6.42 | 54.83 | 93.16 | 93.16 | 99.58 | 8.14 | 19.78 | 19.78 | 62.98 |
| Composition | | | | | | | | | | | |
| $H_2$ | mol % | 73.4671 | 100.0000 | 21.6848 | 0.0000 | 0.0000 | 49.0676 | 0.0000 | 0.0000 | 0.0000 | 0.0000 |
| CO | mol % | 1.5398 | 0.0000 | 4.5450 | 0.0000 | 0.0000 | 0.0000 | 0.0000 | 0.0000 | 0.0000 | 0.0000 |
| $CO_2$ | mol % | 24.0661 | 0.0000 | 71.0341 | 0.0000 | 0.0000 | 0.0000 | 0.0000 | 0.0000 | 0.0000 | 74.4275 |
| $H_2O$ | mol % | 0.3065 | 0.0000 | 0.9047 | 0.0000 | 0.0000 | 0.0000 | 0.0000 | 100.0000 | 100.0000 | 23.3702 |
| $CH_4$ | mol % | 0.2295 | 0.0000 | 0.6775 | 0.0000 | 0.0000 | 0.0000 | 0.0000 | 0.0000 | 0.0000 | 0.0000 |
| $O_2$ | mol % | 0.0000 | 0.0000 | 0.0000 | 0.7898 | 0.7898 | 0.4023 | 99.5000 | 0.0000 | 0.0000 | 1.0000 |
| $N_2$ | mol % | 0.3344 | 0.0000 | 0.9871 | 98.1698 | 98.1698 | 50.0003 | 0.0000 | 0.0000 | 0.0000 | 0.9634 |
| Ar | mol % | 0.0565 | 0.0000 | 0.1669 | 1.0404 | 1.0404 | 0.5299 | 0.5000 | 0.0000 | 0.0000 | 0.2389 |

| | | Stream Number | | | | | | | | |
|---|---|---|---|---|---|---|---|---|---|
| | | 236 | 240 | 242 | 246 | 248 | 252 | 254 | 260 | 258 |
| Temperature | ° C. | 30.00 | 30.00 | 30.00 | 29.70 | 30.00 | 30.00 | 30.00 | 30.00 | 30.00 |
| Pressure | bar a | 1.5 | 1.5 | 1.5 | 2.465043 | 30.99325 | 30.99325 | 30.99325 | 30.99325 | 30.99325 |
| Flow | kg/s | 62.98 | 6.37 | 56.61 | 0.63 | 55.98 | 0.02 | 55.96 | 0.04 | 55.92 |
| Composition | | | | | | | | | | |
| $H_2$ | mol % | 0.0000 | 0.0000 | 0.0000 | 0.0000 | 0.0000 | 0.0000 | 0.0000 | 0.0000 | 0.0000 |
| CO | mol % | 0.0000 | 0.0000 | 0.0000 | 0.0000 | 0.0000 | 0.0000 | 0.0000 | 0.0000 | 0.0000 |
| $CO_2$ | mol % | 74.4275 | 0.0820 | 94.3261 | 0.2778 | 96.8606 | 1.3568 | 96.9431 | 0.0000 | 97.1252 |
| $H_2O$ | mol % | 23.3702 | 99.9180 | 2.8822 | 99.7220 | 0.2725 | 98.6418 | 0.1875 | 100.0000 | 0.0000 |
| $CH_4$ | mol % | 0.0000 | 0.0000 | 0.0000 | 0.0000 | 0.0000 | 0.0000 | 0.0000 | 0.0000 | 0.0000 |
| $O_2$ | mol % | 1.0000 | 0.0000 | 1.2676 | 0.0001 | 1.3018 | 0.0008 | 1.3029 | 0.0000 | 1.3054 |

TABLE I-continued

| | | | | | | | | | | |
|---|---|---|---|---|---|---|---|---|---|---|
| N₂ | mol % | 0.9634 | 0.0000 | 1.2212 | 0.0001 | 1.2541 | 0.0004 | 1.2552 | 0.0000 | 1.2576 |
| Ar | mol % | 0.2389 | 0.0000 | 0.3028 | 0.0000 | 0.3110 | 0.0002 | 0.3112 | 0.0000 | 0.3118 |

Example 2

The process arrangement simulated in Example 2 is identical to that simulated in Example 1 except that the H₂ PSA 204 is optimized for this application. The H₂ recovery is increased (to 92 mol. %) and its purity is decreased by designing the PSA to allow some impurities through with the H₂. This allows a smaller PSA to be used, and also has the surprising benefit that, in allowing inerts to come through with the hydrogen, higher purity CO₂ is produced.

The results of the simulation in Example 2 are provided in Table II.

TABLE II

| | | Stream Number | | | | | | | | | |
|---|---|---|---|---|---|---|---|---|---|---|---|
| | | 202 | 206 | 208 | 226 | 224 | 220 | 212 | 230 | 232 | 222 |
| Temperature | ° C. | 40.00 | 40.00 | 40.00 | 15.00 | 96.00 | 350.00 | 200.00 | 35.00 | 500.00 | 67.01 |
| Pressure | bar a | 27.5 | 27.5 | 27.5 | 3 | 23 | 23 | 1.5 | 150 | 150 | 1.5 |
| Flow | kg/s | 61.25 | 7.37 | 53.89 | 95.58 | 95.58 | 102.95 | 6.67 | 11.83 | 11.83 | 60.56 |
| Composition | | | | | | | | | | | |
| H₂ | mol % | 73.4671 | 99.1486 | 18.4650 | 0.0000 | 0.0000 | 48.7712 | 0.0000 | 0.0000 | 0.0000 | 0.0000 |
| CO | mol % | 1.5398 | 0.5647 | 3.6282 | 0.0000 | 0.0000 | 0.2778 | 0.0000 | 0.0000 | 0.0000 | 0.0000 |
| CO₂ | mol % | 24.0661 | 0.0000 | 75.6085 | 0.0000 | 0.0000 | 0.0000 | 0.0000 | 0.0000 | 0.0000 | 77.9807 |
| H₂O | mol % | 0.3065 | 0.0000 | 0.9629 | 0.0000 | 0.0000 | 0.0000 | 0.0000 | 100.0000 | 100.0000 | 20.3542 |
| CH₄ | mol % | 0.2295 | 0.0000 | 0.7212 | 0.0000 | 0.0000 | 0.0000 | 0.0000 | 0.0000 | 0.0000 | 0.0000 |
| O₂ | mol % | 0.0000 | 0.0000 | 0.0000 | 0.7898 | 0.7898 | 0.4013 | 99.5000 | 0.0000 | 0.0000 | 1.0000 |
| N₂ | mol % | 0.3344 | 0.2453 | 0.5253 | 98.1698 | 98.1698 | 50.0007 | 0.0000 | 0.0000 | 0.0000 | 0.5123 |
| Ar | mol % | 0.0565 | 0.0415 | 0.0888 | 1.0404 | 1.0404 | 0.5490 | 0.5000 | 0.0000 | 0.0000 | 0.1529 |

| | | Stream Number | | | | | | | | |
|---|---|---|---|---|---|---|---|---|---|---|
| | | 236 | 240 | 242 | 246 | 248 | 252 | 254 | 260 | 258 |
| Temperature | ° C. | 30.00 | 30.00 | 30.00 | 29.70 | 30.00 | 30.00 | 30.00 | 30.00 | 30.00 |
| Pressure | bar a | 1.5 | 1.5 | 1.5 | 2.465043 | 30.99325 | 30.99325 | 30.99325 | 30.99235 | 30.99235 |
| Flow | kg/s | 60.56 | 5.11 | 55.45 | 0.61 | 54.84 | 0.02 | 54.82 | 0.04 | 54.78 |
| Composition | | | | | | | | | | |
| H₂ | mol % | 0.0000 | 0.0000 | 0.0000 | 0.0000 | 0.0000 | 0.0000 | 0.0000 | 0.0000 | 0.0000 |
| CO | mol % | 0.0000 | 0.0000 | 0.0000 | 0.0000 | 0.0000 | 0.0000 | 0.0000 | 0.0000 | 0.0000 |
| CO₂ | mol % | 77.9807 | 0.0826 | 95.0869 | 0.2800 | 97.6418 | 1.3672 | 97.7250 | 0.0000 | 97.9087 |
| H₂O | mol % | 20.3542 | 99.9173 | 2.8823 | 99.7198 | 0.2726 | 98.6317 | 0.1876 | 100.0000 | 0.0000 |
| CH₄ | mol % | 0.0000 | 0.0000 | 0.0000 | 0.0000 | 0.0000 | 0.0000 | 0.0000 | 0.0000 | 0.0000 |
| O₂ | mol % | 1.0000 | 0.0000 | 1.2196 | 0.0001 | 1.2525 | 0.0007 | 1.2535 | 0.0000 | 1.2559 |
| N₂ | mol % | 0.5123 | 0.0000 | 0.6248 | 0.0000 | 0.6417 | 0.0002 | 0.6422 | 0.0000 | 0.6434 |
| Ar | mol % | 0.1529 | 0.0000 | 0.1864 | 0.0000 | 0.1914 | 0.0001 | 0.1916 | 0.0000 | 0.1920 |

Example 3

In Example 3, the computer simulated an alternative arrangement of the process depicted in FIG. 2. In this alternative arrangement, synthesis gas is produced from the gasification of coal in a gasifier (not shown). As in Examples 1 and 2, the synthesis gas is cooled to 40° C. and condensed water removed prior to being fed as stream 202 to the H₂ PSA 204. The PSA is operating to produce pure (100 mol. %) H₂ at 90 mol. % recovery.

The synthesis gas will contain H₂S which will combust to produce SO₂ which can be removed as sulfuric acid in the compression system by the addition of NOₓ.

The results of the simulation of Example 3 are provided in Table III.

TABLE III

| | | Stream Number | | | | | | | | | |
|---|---|---|---|---|---|---|---|---|---|---|---|
| | | 202 | 206 | 208 | 226 | 224 | 220 | 212 | 230 | 232 | 222 |
| Temperature | °C. | 40.00 | 40.00 | 40.00 | 15.00 | 96.00 | 350.00 | 200.00 | 35.00 | 500.00 | 58.12 |
| Pressure | bar a | 27.5 | 27.5 | 27.5 | 3 | 23 | 23 | 1.5 | 150 | 150 | 1.5 |
| Flow | kg/s | 120.31 | 6.05 | 114.26 | 87.64 | 87.64 | 93.68 | 9.38 | 23.21 | 23.21 | 123.64 |
| Composition | | | | | | | | | | | |
| $H_2$ | mol % | 55.5876 | 100.0000 | 11.1239 | 0.0000 | 0.0000 | 49.0838 | 0.0000 | 0.0000 | 0.0000 | 0.0000 |
| CO | mol % | 1.8528 | 0.0000 | 3.7078 | 0.0000 | 0.0000 | 0.0000 | 0.0000 | 0.0000 | 0.0000 | 0.0000 |
| $CO_2$ | mol % | 40.3946 | 0.0000 | 80.8357 | 0.0000 | 0.0000 | 0.0000 | 0.0000 | 0.0000 | 0.0000 | 83.1080 |
| $H_2O$ | mol % | 0.3168 | 0.0000 | 0.6340 | 0.0000 | 0.0000 | 0.0000 | 0.0000 | 100.0000 | 100.0000 | 12.5872 |
| $CH_4$ | mol % | 0.1853 | 0.0000 | 0.3707 | 0.0000 | 0.0000 | 0.0000 | 0.0000 | 0.0000 | 0.0000 | 0.0000 |
| $O_2$ | mol % | 0.0000 | 0.0000 | 0.0000 | 0.7898 | 0.7898 | 0.4021 | 99.5000 | 0.0000 | 0.0000 | 1.0000 |
| $N_2$ | mol % | 0.7412 | 0.0000 | 1.4834 | 98.1698 | 98.1698 | 49.9843 | 0.0000 | 0.0000 | 0.0000 | 1.4518 |
| AR | mol % | 0.7411 | 0.0000 | 1.4831 | 1.0404 | 1.0404 | 0.5297 | 0.5000 | 0.0000 | 0.0000 | 1.4993 |
| $H_2S$ | mol % | 0.1806 | 0.0000 | 0.3613 | 0.0000 | 0.0000 | 0.0000 | 0.0000 | 0.0000 | 0.0000 | 0.0000 |
| $SO_2$ | mol % | 0.0000 | 0.0000 | 0.0000 | 0.0000 | 0.0000 | 0.0000 | 0.0000 | 0.0000 | 0.0000 | 0.3536 |

| | | Stream Number | | | | | | | | |
|---|---|---|---|---|---|---|---|---|---|---|
| | | 236 | 240 | 242 | 246 | 248 | 252 | 254 | 260 | 258 |
| Temperature | °C. | 30.00 | 30.00 | 30.00 | 23.76 | 24.00 | 24.00 | 24.00 | 24.00 | 24.00 |
| Pressure | bar a | 1.5 | 1.5 | 1.5 | 2.465043 | 30.99325 | 30.99325 | 30.99325 | 30.99325 | 30.99325 |
| Flow | kg/s | 123.64 | 5.52 | 118.11 | 1.35 | 116.77 | 0.03 | 116.74 | 0.06 | 116.67 |
| Composition | | | | | | | | | | |
| $H_2$ | mol % | 0.0000 | 0.0000 | 0.0000 | 0.0000 | 0.0000 | 0.0000 | 0.0000 | 0.0000 | 0.0000 |
| CO | mol % | 0.0000 | 0.0000 | 0.0000 | 0.0000 | 0.0000 | 0.0000 | 0.0000 | 0.0000 | 0.0000 |
| $CO_2$ | mol % | 83.1080 | 0.0802 | 92.3363 | 0.2657 | 94.8934 | 1.5109 | 94.9497 | 0.0000 | 95.0768 |
| $H_2O$ | mol % | 12.5872 | 99.9084 | 2.8817 | 99.6978 | 0.1929 | 98.3088 | 0.1337 | 100.0000 | 0.0000 |
| $CH_4$ | mol % | 0.0000 | 0.0000 | 0.0000 | 0.0000 | 0.0000 | 0.0000 | 0.0000 | 0.0000 | 0.0000 |
| $O_2$ | mol % | 1.0000 | 0.0000 | 1.1111 | 0.0001 | 1.1420 | 0.0007 | 1.1427 | 0.0000 | 1.1442 |
| $N_2$ | mol % | 1.4518 | 0.0000 | 1.6132 | 0.0001 | 1.6580 | 0.0006 | 1.6590 | 0.0000 | 1.6612 |
| AR | mol % | 1.4993 | 0.0001 | 1.6660 | 0.0002 | 1.7122 | 0.0010 | 1.7133 | 0.0000 | 1.7156 |
| $H_2S$ | mol % | 0.0000 | 0.0000 | 0.0000 | 0.0000 | 0.0000 | 0.0000 | 0.0000 | 0.0000 | 0.0000 |
| $SO_2$ | mol % | 0.3536 | 0.0113 | 0.3917 | 0.0362 | 0.4016 | 0.1778 | 0.4017 | 0.0000 | 0.4022 |

The cold gas efficiency of a conventional gasifier is about 71%. In this embodiment of the present invention, the gases produced from the shift reactor include all the sulfur in the coal predominantly as $H_2S$. Any COS or $CS_2$ is converted to $H_2S$. By burning the $H_2S$ to $H_2O$ and $SO_2$ the cold gas efficiency can unexpectedly be increased from 71% to 72.4% (based on gasifying a typical 6% sulphur petcoke).

Throughout the specification, the term "means" in the context of means for carrying out a function, is intended to refer to at least one device adapted and/or constructed to carry out that function.

It will be appreciated that the invention is not restricted to the details described above with reference to the preferred embodiments but that numerous modifications and variations can be made without departing from the spirit and scope of the invention as defined in the following claims.

The invention claimed is:

1. A method of treating a gaseous mixture comprising hydrogen ($H_2$), carbon dioxide ($CO_2$) and at least one combustible gas selected from the group consisting of hydrogen sulfide ($H_2S$), carbon monoxide (CO) and methane ($CH_4$), said method comprising:
   separating $H_2$ from said gaseous mixture to produce a separated $H_2$ gas and a crude $CO_2$ gas comprising said combustible gas(es);
   combusting in a first combustor at least a portion of said combustible gas(es) in at least a portion of said crude $CO_2$ gas in the presence of oxygen ($O_2$) to produce heat and a $CO_2$ product gas comprising combustion products of said combustible gas(es), wherein the purity of the $CO_2$ product gas is greater than or equal to 90 mol % $CO_2$ on a dry basis without further purification;
   recovering at least a portion of said heat from at least a portion of said $CO_2$ product gas by indirect heat exchange with at least a portion of said separated $H_2$ gas or a gas derived therefrom to produce warmed $H_2$-containing gas and cooled $CO_2$ product gas;
   compressing an air stream in a compressor;
   feeding at least a portion of the compressed air stream into a second combustor;
   feeding at least a portion of the warmed $H_2$-containing gas into the second combustor to produce a resultant high temperature flue gas;
   feeding at least a portion of the resultant high temperature flue gas from the second combustor into an expander for power generation,
   wherein the $CO_2$ product gas or a stream derived therefrom, is compressed to pipeline pressure of about 80 bar to about 250 bar.

2. The method according to claim 1 further comprising: introducing at least one diluent fluid selected from the group consisting of nitrogen ($N_2$) and water ($H_2O$) to said separated $H_2$ gas.

3. The method according to claim 1 wherein said $H_2$ is separated from said gaseous mixture by pressure swing adsorption.

4. The method according to claim 1 wherein said $H_2$ is separated from said gaseous mixture by an amine scrubbing process or physical solvent absorption process.

5. The method according to claim 1 wherein said combustible gas(es) in said crude $CO_2$ gas are combusted in an oxyfuel combustion process using an excess of oxidant gas consisting essentially of $O_2$ and, optionally, recycled $CO_2$ product gas.

6. The method according to claim 5 wherein at least one fuel selected from the group consisting of carbonaceous fuel, hydrocarbonaceous fuel and biomass fuel is combusted in the oxyfuel combustion process.

7. The method according to claim 6 wherein the oxyfuel combustion process is the combustion of pulverized coal in a water boiler producing steam for expansion to generate power.

8. The method according to claim 7 further comprising:
pre-heating boiler feed water by indirect heat exchange with said gaseous mixture to produce cooled gaseous mixture and preheated boiler feed water; and
feeding at least a portion of said pre-heated boiler feed water to said water boiler to produce steam for power generation.

9. The method according to claim 1 wherein the $CO_2$ product gas comprises one or more contaminants selected from the group consisting of $SO_2$, $SO_3$ and $NO_x$, said method further comprising the removal of at least a portion of said contaminant(s) from the $CO_2$ product gas, where prior to compressing the $CO_2$ product gas to the pipeline pressure of about 80 bar to about 250 bar
the $CO_2$ product gas is washed with water to produce cooled, $SO_3$-free, $CO_2$ product gas;
said cooled, $SO_3$-free, $CO_2$ product gas is maintained at elevated pressure(s) in the presence of $O_2$ and water and, when $SO_2$ is to be removed, $NO_x$, for a sufficient time to convert $SO_2$ to sulfuric acid and/or NO to nitric acid; and
said sulfuric acid and/or nitric acid are separated from said cooled, $SO_3$-free, $CO_2$ product gas to produce $SO_x$-free, $NO_x$-lean $CO_2$ gas.

10. The method according to claim 9 wherein at least a portion of said $SO_x$-free, $NO_x$-lean $CO_2$ gas is dried and purified to remove inert components prior to being compressed to a pipeline pressure of about 80 bar to about 250 bar.

11. The method according to claim 1 further comprising producing heat and at least a portion of said $H_2$ in said gaseous mixture by reacting CO with $H_2O$ in a shift conversion reaction.

12. The method according to claim 11 wherein at least a portion of the heat generated in the shift conversion reaction is used to preheat boiler feed water.

13. The method according to claim 11 wherein at least at least a portion of said CO is produced in the form of synthesis gas by partially oxidizing or reforming a fuel selected from the group, consisting of carbonaceous fuel, hydrocarbonaceous fuel and biomass fuel.

14. The method according to claim 13 wherein said fuel, is natural gas which is, partially oxidized in the presence of $O_2$ to produce said synthesis gas.

15. The method according to claim 13 wherein said fuel is natural gas which is reformed catalytically with steam to produce said synthesis gas.

16. The method according to claim 13 wherein said fuel is coal which is gasified to produce said synthesis gas.

17. The method according to claim 16 further comprising quenching said gasification using water after said water is warmed by indirect heat exchange against said gaseous mixture.

18. The method according to claim 17 wherein at least a portion of said water is condensed and separated from said gaseous mixture before warming.

19. The method according to claim 13 wherein the gaseous mixture is produced from the shift conversion reaction at the highest possible synthesis gas production pressure, said method further comprising reducing the pressure of gaseous mixture to a pressure which favors the use of separated $H_2$ gas or a $H_2$-containing gas derived therefrom in a gas turbine.

20. A method of producing power, said method comprising:
partially oxidizing or reforming a fuel selected from the group consisting of carbonaceous fuel, hydrocarbonaceous fuel and biomass fuel, to produce synthesis gas;
reacting at least a portion of the CO in the synthesis gas with $H_2O$ in a shift conversion reaction to produce a gaseous mixture comprising $H_2$, $CO_2$ and at least one combustible gas selected from the group consisting of $H_2S$, CO and $CH_4$;
separating $H_2$ from said gaseous mixture to produce a separated $H_2$ gas and a crude $CO_2$ gas comprising said combustible gas(es);
combusting at least a portion of said combustible gas(es) in said crude $CO_2$ gas in an oxyfuel combustion process using an excess of oxidant gas consisting essentially of $O_2$ and, optionally, at least one fuel selected from the group consisting of carbonaceous fuel, hydrocarbonaceous fuel and biomass fuel, to produce heat and a $CO_2$ product gas comprising combustion products of said combustible gas(es), wherein the purity of the $CO_2$ product qas is greater than or equal to 90 mol % $CO_2$ on a dry basis without further purification;
recycling a portion of said $CO_2$ product gas as feed to the oxyfuel combustion process;
recovering at least a portion of said heat from at least a portion of said $CO_2$ product gas by indirect heat exchange with at least a portion of said separated $H_2$ gas or a gas derived therefrom, to produce warmed turbine fuel gas and cooled $CO_2$ product gas; and
feeding warmed turbine fuel gas to a gas turbine for power generation.

* * * * *

UNITED STATES PATENT AND TRADEMARK OFFICE
CERTIFICATE OF CORRECTION

| | | |
|---|---|---|
| PATENT NO. | : 7,909,898 B2 | Page 1 of 1 |
| APPLICATION NO. | : 11/345051 | |
| DATED | : March 22, 2011 | |
| INVENTOR(S) | : White et al. | |

It is certified that error appears in the above-identified patent and that said Letters Patent is hereby corrected as shown below:

Column 23, Line 34

In claim 9, delete "NO" and insert -- $No_x$ --

Column 23, Line 49

In claim 13, delete "at least"

Column 23, Line 52

In claim 13, delete "group," and insert -- group --

Column 24, Line 1

In claim 14, delete "fuel," and insert -- fuel --

Column 24, Line 2

In claim 14, delete "is," and insert -- is --

Column 24, Line 42

In claim 20, delete "qas" and insert -- gas --

Signed and Sealed this
Twenty-eighth Day of June, 2011

David J. Kappos
*Director of the United States Patent and Trademark Office*